United States Patent [19]
Kadota

[11] Patent Number: 5,625,143
[45] Date of Patent: Apr. 29, 1997

[54] MISFIRE DETECTOR FOR INTERNAL COMBUSTION ENGINE

[75] Inventor: Yoichi Kadota, Himeji, Japan

[73] Assignee: Mitsubishi Denki Kabushiki Kaisha, Tokyo, Japan

[21] Appl. No.: 500,503

[22] Filed: Jul. 11, 1995

[30] Foreign Application Priority Data

Jul. 20, 1994 [JP] Japan .................... 6-168396

[51] Int. Cl.⁶ .................................. F02P 17/00
[52] U.S. Cl. .................. 73/116; 324/391; 324/392; 364/431.03; 123/419
[58] Field of Search .................... 324/379, 380, 324/378, 384, 391, 392; 364/431.03; 73/116; 123/419

[56] References Cited

U.S. PATENT DOCUMENTS

| | | | |
|---|---|---|---|
| 5,200,899 | 4/1993 | Ribbens | 324/379 |
| 5,239,473 | 8/1993 | Ribbens | 324/379 |
| 5,258,753 | 11/1993 | Jonker | 324/379 |

FOREIGN PATENT DOCUMENTS

| | | |
|---|---|---|
| 159438 | 6/1992 | Japan . |
| 209950 | 7/1992 | Japan . |
| 194346 | 7/1992 | Japan . |
| 81708 | 3/1994 | Japan . |

*Primary Examiner*—Kenneth A. Wieder
*Assistant Examiner*—Jose M. Solis
*Attorney, Agent, or Firm*—Sughrue, Mion, Zinn, Macpeak & Seas

[57] ABSTRACT

A misfire detector for an internal combustion engine is provided which, if any of a plurality of modification factors is replaced by a value out of the proper range, can prevent erroneous misfire detection from, continuing. The misfire detector comprises a period measurement unit of signals generated by a crank angle sensor, a modification factor calculating unit for, based on a ratio between the periods of the plurality of signals in a steady operating condition, calculating a plurality of modification factors used to modify errors in period values, a modification factor propriety determining unit for determining whether the plurality of modification factors calculated by the modification factor calculating unit are in the proper range or not, a period variation factor calculating unit for, based on the periods values and the modification factors which have been determined as being proper, calculating each period variation factor used to quantitize variations in the period, and a misfire determining unit for determining the occurrence of a misfire based on the period variation factor calculated by the period variation factor calculating unit.

5 Claims, 8 Drawing Sheets

MISFIRE DETECTOR FOR INTERNAL COMBUSTION ENGINE

FIELD OF THE INVENTION

The present invention relates to a misfire detector for an internal combustion engine, and more particularly to a misfire detector for an internal combustion engine which detects a misfire by determining variations in the rotational speed of the internal combustion engine.

DESCRIPTION OF THE RELATED ART

Figure 7:
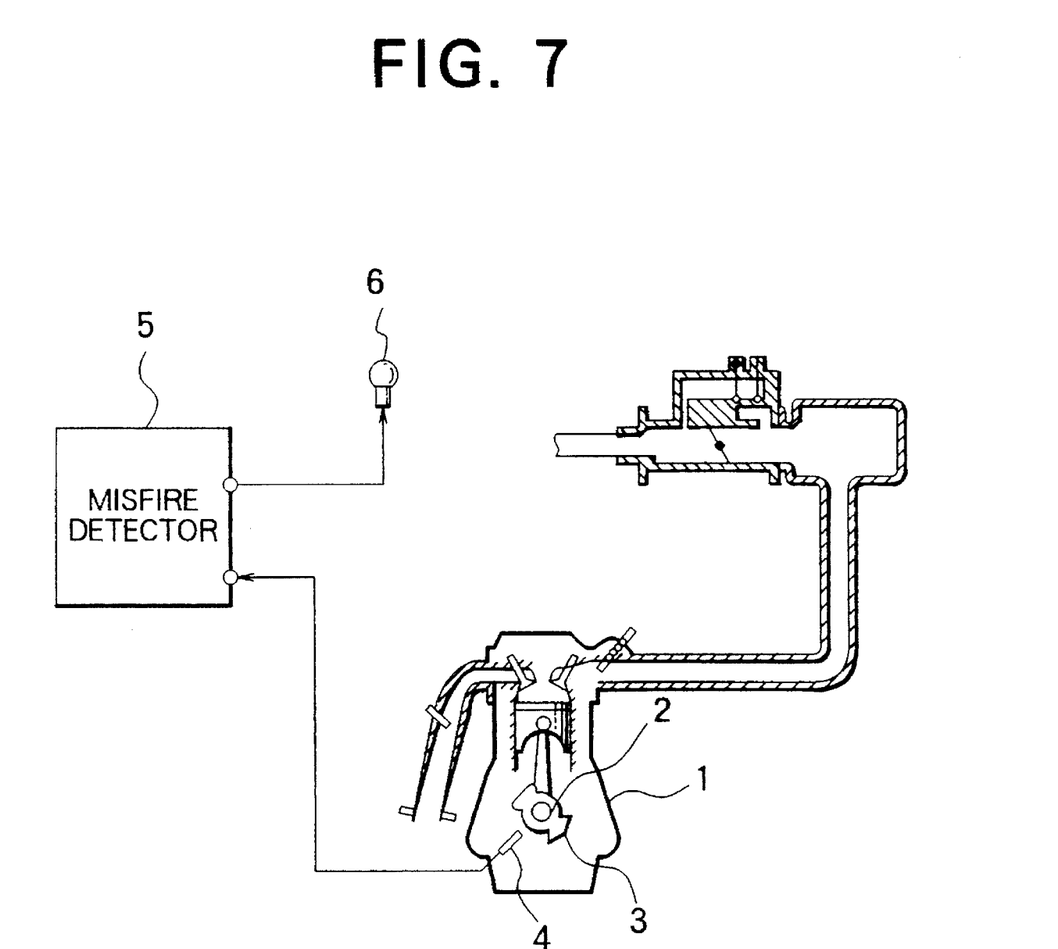
FIG. 7 is a schematic diagram showing a prior art misfire detector for an internal combustion engine and thereabout.

FIG. 7 is a schematic diagram showing a prior art misfire detector for an internal combustion engine disclosed in, for example, Japanese Patent Laid-Open No. 4-194346.

As shown in FIG. 7, the prior art system for detecting misfires in an internal combustion engine comprises an internal combustion engine body 1, a crankshaft 2 disposed in the engine body 1, a sensing blade 3 attached to the crankshaft 2, a crank angle sensor 4 for detecting edges of teeth (segments) of the sensing blade 3 and converting the detected segment angle into an electric signal, a misfire detector 5 for detecting variations in rotation of the engine based on an output signal SGT generated by the crank angle sensor 4 and determining the occurrence of a misfire, and an indicator 6 for informing a driver of an abnormal condition when the misfire detector 5 detects misfires at a probability greater than a predetermined value. The misfire detector 5 receives the detected signal from the crank angle sensor 4, determines the occurrence of a misfire based on the detected signal, and supplies the determined result to the indicator 6.

Figure 8:
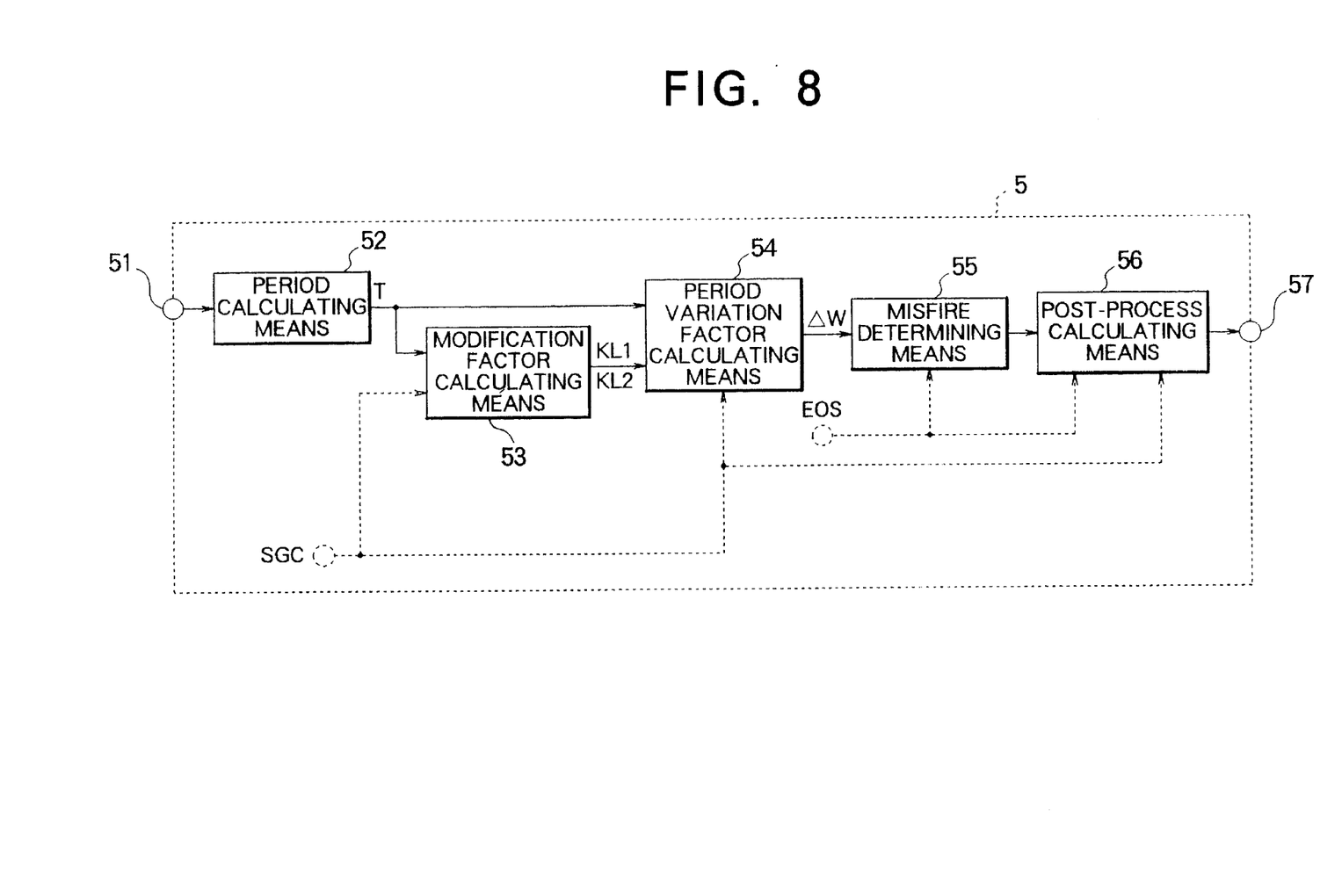
FIG. 8 is a block diagram showing one example of circuit configuration of the prior art misfire detector for an internal combustion engine.

FIG. 8 is a functional block diagram of the misfire detector 5 using modification factors for errors in detection of the segment angles, by way of example, in a 4-cylinder engine.

Figure 10:
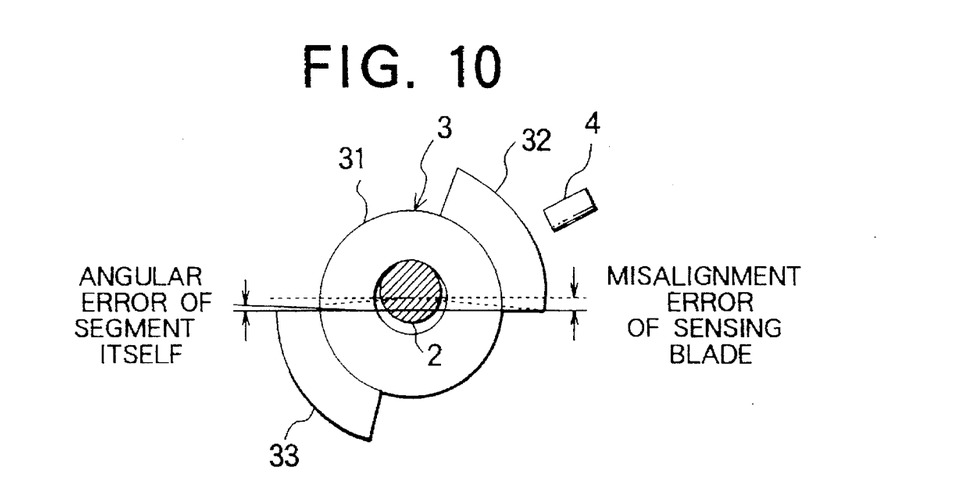
FIG. 10 is a view for explaining assembly errors of a sensing blade in the prior art misfire detector for an internal combustion engine.

As shown in FIG. 8, the misfire detector 5 comprises an input terminal 51 to which the output signal SGT from the crank angle sensor 4 is supplied, period calculating means 52 for, based on the output signal SGT from the crank angle sensor 4, calculating periods T between predetermined angles of the engine which are determined by the edge positions of the segments of the sensing blade 3, and modification factor calculating means 53 for, based on the periods T calculated by the period calculating means 52 and information of a cylinder identification signal SGC from a cylinder identification sensor (not shown), calculating modification factors KL1, KL2 used to modify period errors occurring with errors in the edge angles of segments 32, 33 (FIG. 10).

The misfire detector 5 further comprises period variation factor calculating means 54 for, based on the periods T calculated by the period calculating means 52 and the modification factors KL1, KL2 from the modification factor calculating means 53, calculating each mean angular acceleration variance $\alpha W$ as a period variation factor used to quantitize period variations, misfire determining means 55 for determining the occurrence of a misfire based on misfire determination reference values which are determined in accordance with information EOS indicating an operating condition of the engine, such as a rotational speed and load thereof, and on the mean angular acceleration variance $\alpha W$ from the period variation factor calculating means 54, and post-process calculating means 56 for counting a misfire determination signal output from the misfire determining means 55, storing the item indicating the occurrence of a failure when it is determined in consideration of the information EOS indicating an operating condition of the engine, the cylinder identification signal SGC, etc., as well that misfires have occurred at a probability greater than a predetermined value, and lighting up the indicator 6 (FIG. 7) through an output terminal 57 to inform the failed condition.

Operation of the misfire detector will now be described with reference to FIG. 9.

Figure 9:
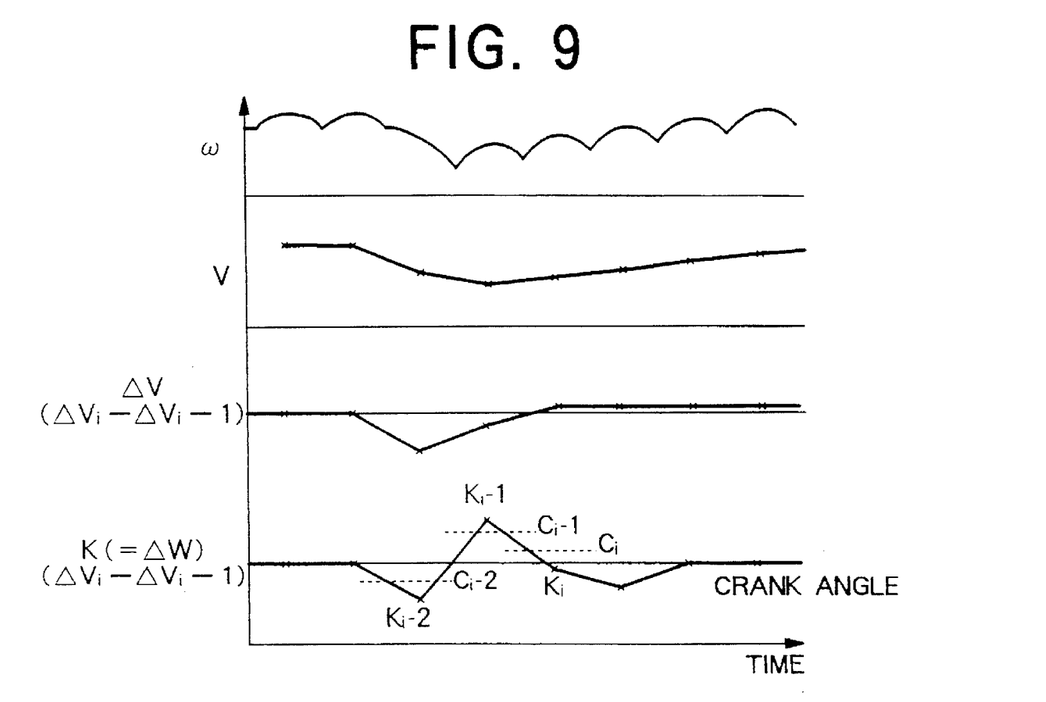
FIG. 9 is a time chart for explaining operation of the prior art misfire detector for an internal combustion engine.

FIG. 9 is a time chart for explaining general operation of the misfire detector shown in FIG. 8, the chart showing the case where a misfire has occurred only once during a process of normal combustion. In FIG. 9, $\omega$ represents an actual rotational angular speed of the engine, V represents a mean angular speed calculated based on the period T between falling edges of the output signal SGT generated from the crank angle sensor 4, $\Delta V$ represents a difference between the preceding calculated value and the current calculated value of the mean angular speed V, i.e., a mean angular acceleration, and $\Delta W$ represents a mean angular acceleration variance (variation) between the preceding calculated value and the current calculated value of the mean angular acceleration $\Delta V$, the mean angular acceleration variance $\Delta W$ being used as a function K for misfire determination.

The misfire detector 5 detects the occurrence of a misfire as follows.

First, referring to FIGS. 8–10, the period calculating means 52 calculates the pulse period T for each unit crank angle based on the output signal SGT from the crank angle sensor 4. Then, the modification factor calculating means 53 calculates, based on the periods T from the period calculating means 52 and the information of the cylinder identification signal SGC, the modification factors KL1, KL2 used to modify period errors occurring with errors in the edge angles of the segments 32, 33. Following that, the period variation factor calculating means 54 calculates, based on the periods T from the period calculating means 52 and the modification factors KL1, KL2 from the modification factor calculating means 53, each mean angular acceleration variance $\Delta W$ as a period variation factor used to quantitize period variations.

Subsequently, the misfire determining means 55 compares the misfire determination reference values determined in accordance with the information EOS indicating an operating condition of the engine and the mean angular acceleration variances $\Delta W$ from the period variation factor calculating means 54, thereby determining the occurrence of a misfire.

More specifically, a current value $K_i$, a preceding value $K_{i-1}$ and a two-time preceding value $K_{i-2}$ of the function K (the mean angular acceleration variance $\Delta W$) for misfire determination are compared respectively with misfire determination reference values $C_i$, $C_{i-1}$ and $C_{i-2}$ which are determined for the respective values. Then, if the relationships of $K_i < C_i$, $K_{i-1} > C_{i-1}$ and $K_{i-2} < C_{i-2}$ are met, the means 55 determines the occurrence of a misfire.

After that, the post-process calculating means 56 counts the misfire determination signal output from the misfire determining means 55, stores the item indicating the occurrence of a failure when it is determined in view of the information EOS indicating an operating condition of the engine, the cylinder identification signal SGC, etc., as well that misfires have occurred at a probability greater than a predetermined value, and lights up the indicator 6 through the output terminal 57 to inform the failed condition the thus-arranged prior art misfire detector for an internal combustion engine has suffered the following problem.

Generally, the crank angles indicated by the segment edges of the sensing blade 3 attached to the engine crankhaft 2 includes, though small, unavoidable errors.

FIG. 10 illustrates the causes of errors in detection of the segment angles of the sensing blade 3. In FIG. 10, the sensing blade 3 comprises a central portion 31 and the segments 32, 33 molded as a unitary structure with the central portion 31. The segment 32 determines the timing of the output signal SGT from the crank angle sensor 4 that corresponds to BTDC 75° and BTDC 5° of the first and fourth cylinders, whereas the segment 33 determines the timing of the output signal SGT from the crank angle sensor 4 that corresponds to BTDC 75° and BTDC 5° of the second and third cylinders.

The segments 32, 33 undergo errors during the manufacture and assembly steps of the sensing blade 3, and the errors appear in the period T of the output signal SGT from the crank angle sensor 4 when the segments 32, 33 are rotated at a constant speed with operation of the engine. In other words, errors in lengths of the segments 32, 33 can be detected from the period T of the output signal SGT from the crank angle sensor 4. Therefore, the aforesaid modification factors KL1, KL2 are given respectively by ratios of the time periods equivalent to the lengths of the segments 32, 33 to the time period $(T_i+T_{i-1})$ during which the segments 32, 33 of the sensing blade 3 make one rotation.

A hatched portion in FIG. 10 represents a cross-section of the engine crankshaft 2. There are many causes of detection errors in the angle signal detected by the crank angle sensor 4. Of them, important ones are an error of the segment angle involved during the manufacture of the sensing blade itself, and a misalignment of the center of rotation due to an assembly error between the sensing blade 3 and the crankshaft 2 produced when the sensing blade 3 is assembled to the engine.

Figure 11:
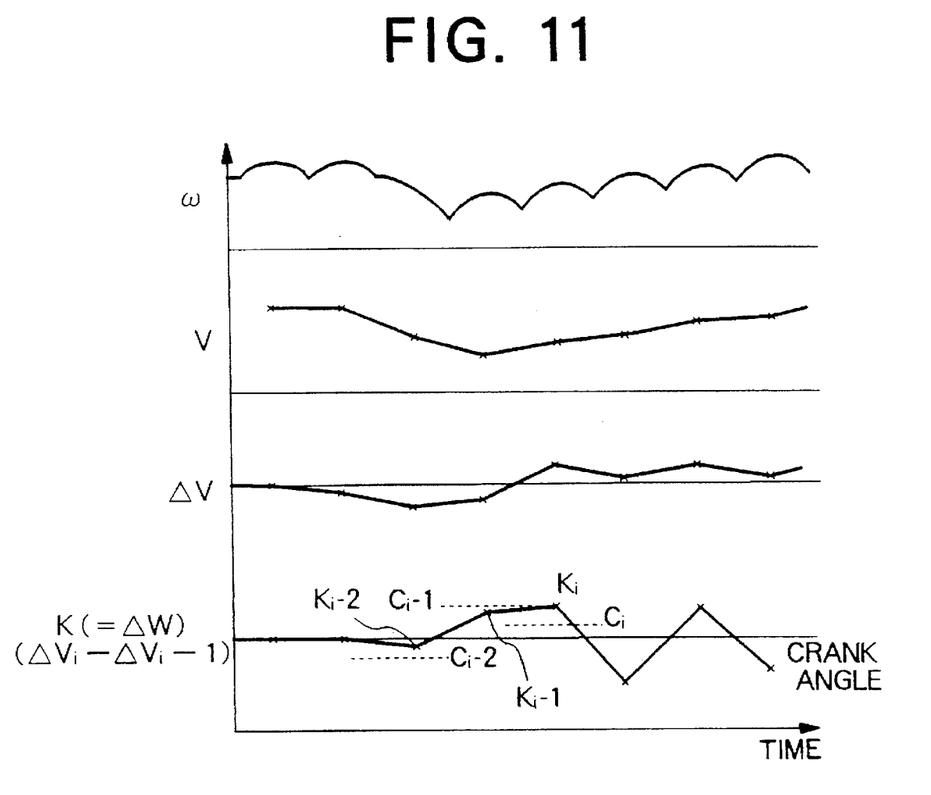
FIG. 11 is a time chart for explaining misfire detecting operation of the prior art misfire detector for an internal combustion engine.

FIG. 11 shows the results of simulating the respective functions used in the prior art assuming, for example, that the detection errors in angular intervals of the output signal SGT from the crank angle sensor 4 caused by the misalignment of the center of rotation is 0.4°. As seen from FIG. 11, when misfire detection is performed by using the function K in the same manner as above, since the detection errors also bring forth an error in the function K, the aforesaid misfire determining conditions are not satisfied in spite of the fact that the rotation variation due to a misfire is actually generated. Thus, the misfire cannot be correctly detected. On the other hand, in spite of the fact that the rotation variation due to a misfire is not actually generated, a misfire may be erroneously detected.

To prevent such a drawback, a misfire detector has heretofore been proposed which employs the same components as above, has a function of learning a plurality of modification factors designed to avoid misjudgment caused by detection errors of the segment angles, and modifies the period variation factor based on the learned modification factor, thereby ensuring high accuracy of misfire determination.

The proposed misfire detector has, however, the following problems. The output signal SGT from the crank angle sensor 4 is an electrical signal. If electrical noise is superimposed on the signal SGT and the values (learned values) usually stored in a memory of the misfire detector are erroneously replaced by improper values, subsequent normal combustion may be determined as a misfire as a result of incorrect modification based on the improper learned values. Further, while misfires are being detected, update of the learned values is usually inhibited because the period of the output signal SGT from the crank angle sensor 4 is varied. Therefore, if misfires are successively detected by mistake, the chance of restoring the learned value to a normal state is practically lost from then on, resulting in the continuing malfunction of the misfire detector.

SUMMARY OF THE INVENTION

With a view to solving the problems set forth above, an object of the present invention is to provide a highly reliable misfire detector for an internal combustion engine which, in a process of dealing with abnormal conditions of modification factors (learned values) for misfire detection prepared to avoid misjudgment caused by detection errors of the segment angles, can positively and quickly detect abnormality of the modification factors by determining the modification factors are abnormal if relative differences between a plurality of modification factors are too large, taking into account that the plurality of modification factors are shifted in the same positive or negative direction with respect to time during normal operation, and which, if any o f the plurality of modification factors is replaced by a value out of the proper range, can prevent erroneous misfire detection from continuing.

According to one aspect of the present invention, a misfire detector for an internal combustion engine comprises period calculating means for calculating periods of a plurality of signals per one revolution of a crankshaft generated by a crank angle sensor for each predetermined crank angle in the internal combustion engine; modification factor calculating means for, based on a ratio between the periods of the plurality of signals in a steady operating condition, calculating a plurality of modification factors used to modify errors in period calculations; modification factor propriety determining means for determining whether the plurality of modification factors calculated by the modification factor calculating means are in the proper range or not; period variation factor calculating means for, based on the periods calculated by the period calculating means and the modification factors which have been determined as being proper by the modification factor propriety determining means, calculating each period variation factor used to quantitize variations in the period; misfire determining means for determining the occurrence of a misfire based on the period variation factor calculated by the period variation factor calculating means; and processing means for resetting the plurality of modification factors to initial values when the difference between maximum one and minimum one of the plurality of modification factors calculated by the modification factor calculating means exceeds a predetermined value.

With this arrangement, even if any of the plurality of modification factors is replaced by a value out of the proper range, erroneous misfire detection can be prevented from continuing, resulting in higher reliability of the misfire detector.

In one embodiment of the invention, the initial values are final values used during the latest steady operation.

With this arrangement, when the modification factors (learned values) exceed the proper value owing to some transient cause, the values learned so far can be used without repeating the process of learning, and reliable misfire determination can be restarted immediately.

In another embodiment of the invention, the initial values are calculated using the maximum one and minimum one of the plurality of modification factors.

With this arrangement, when the difference between the modification factors, i.e., between the learned values, exceeds the proper value, the learned values as initial values are reset to not fixed values, but a value based on both the latest learned values. Therefore, when the difference between the learned values exceeds the proper value owing to some transient cause, the latest learning result (i.e., a value close to the final learned values falling within the proper range) can be utilized without repeating the process of learning, and reliable misfire determination can be restarted immediately.

In a further embodiment of the invention, the initial values are each a mean value of the latest two among the plurality of modification factors.

With this arrangement, when the difference between the modification factors, i.e., between the learned values, exceeds the proper value, the learned values as initial values are reset to not fixed values, but the mean value of both the latest learned values. Therefore, when the difference between the learned values exceeds the proper value owing to some transient cause, the latest learning result (i.e., a value close to the final learned values falling within the proper range) can be utilized without repeating the process of learning, and the reliable misfire determination can be restarted immediately.

DETAILED DESCRIPTION OF THE PREFERRED EMBODIMENTS

One embodiment of a misfire detector for an internal combustion engine according to the present invention will be described below with reference to the accompanying drawings, taking an application to a motor vehicle equipped with a 4-cylinder engine as an example.

Embodiment 1.

Figure 1:
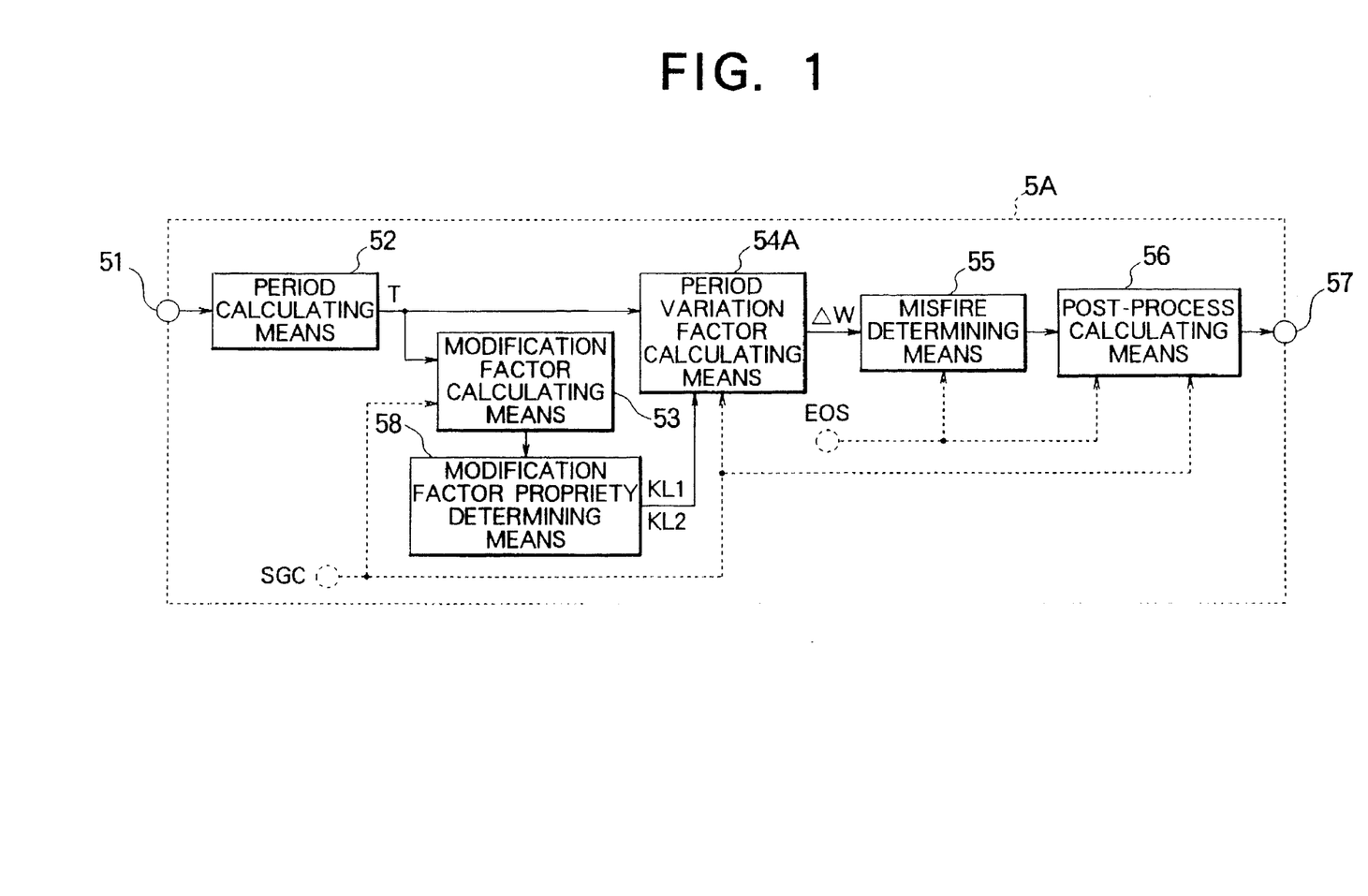
FIG. 1 is a block diagram showing one embodiment of a misfire detector for an internal combustion engine according to the present invention.

FIG. 1 is a functional block diagram showing Embodiment 1 of the present invention.

Components in FIG. 1 corresponding to those in FIG. 8 are denoted by the same reference numerals and will not be described here.

Referring to FIG. 1, a misfire detector 5A includes modification factor propriety determining means 58 for determining whether the modification factors KL1, KL2 calculated by the modification factor calculating means 53 are in the proper range or not, and modifying the modification factors if they are out of the proper range, and period variation factor calculating means 54A for, based on the periods T calculated by the period calculating means 52 and the modification factors KL1, KL2 which have been determined as being proper by the modification factor propriety determining means 58, calculating each mean angular acceleration variance $\Delta W$ as a period variation factor used to quantitize variations in the period T. The remaining configuration is the same as in FIG. 8.

Figure 2:
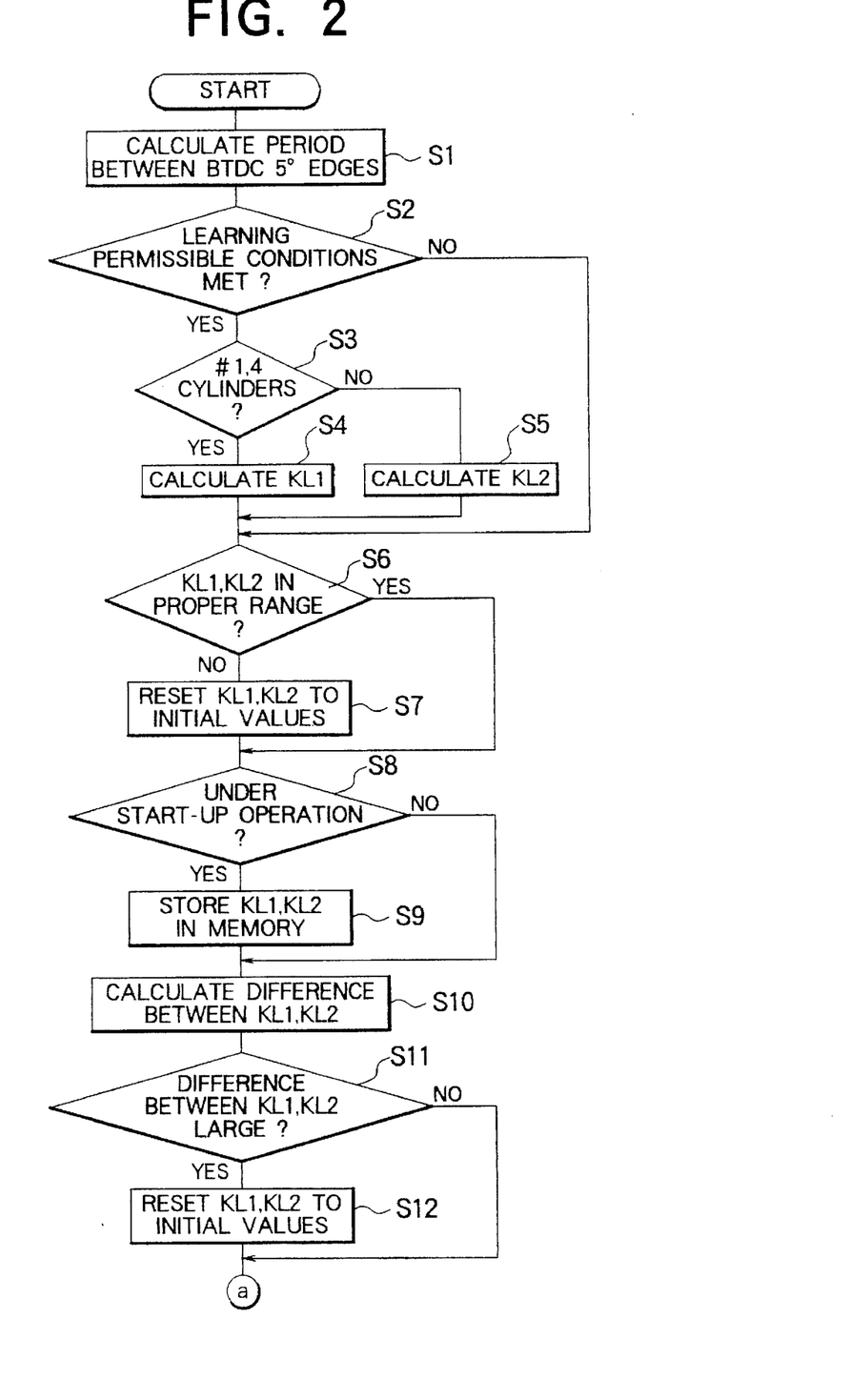
FIG. 2 is a flowchart for explaining operation of one embodiment of the misfire detector for an internal combustion engine according to the present invention.

Operation of the misfire detector shown in FIG. 1 will now be described with flowcharts of FIGS. 2 and 3.

First, in step S1, the period calculating means 52 calculates each period T between BTDC 5° edges of the output signal SGT from the crank angle sensor 4 (FIG. 7).

Then, in step S2, the modification factor calculating means 53 determines, based on the information EOS indicating an operating condition of the engine, such as a rotational speed (rpm) and load thereof, whether the current operating condition of the engine meets preset operating condition under which learning calculations of the modification factors are allowed, i.e., whether learning permissible conditions are met, and then executes a subsequent learning calculation process only when the learning permissible conditions are met. The learning permissible conditions include, for example, the fact that the rotational speed of the engine is in the range of 1000 to 4000 rpm and, in addition, misfire determining conditions described later for inhibiting the learning calculations when there is anxiety about the occurrence of a misfire.

Subsequently, in step S3, the segment to which current period $T_i$ corresponds is determined; i.e., to which pair of first (#1) and fourth (#4) cylinders and third (#3) and second (#2) cylinders of the total four cylinders. Depending on the result, which of the modification factors KL1 and KL2 is to be updated at the present is decided. By way of example, the modification factor KL1 is used for the first and fourth cylinders, and the modification factor KL2 is used for the third and second cylinders.

The modification factors KL1 and KL2 are then calculated in accordance with the following equations (1) and (2), respectively, in step S4 and S5 for the first and fourth cylinders and the third and second cylinders. As a result, the modification factors KL1 and KL2 are alternately updated at each falling edge of the output signal SGT from the crank angle sensor 4. Note that when the modification factor KL1 is updated, the modification factor KL2 is not updated; i.e., $KL2_i = KL2_{i-1}$, while when the modification factor KL2 is updated, the modification factor KL1 is not updated; i.e., $KL1_i = KL1_{i-1}$.

$$KL1_i = Ks \times KL1_{i-1} + (1-Ks) \times KR_i \quad (1)$$

$$KL2_i = Ks \times KL2_{i-1} + (1-Ks) \times KR_i \quad (2)$$

In the above equations (1) and (2), $KR_i$ is a value obtained by normalizing a ratio of the period of the latest half revolution of the engine to the period of one revolution thereof determined from the latest two periods T, and is defined below:

$$KR_i = 2 \times T_i / (T_i + T_{i-1}) \qquad (3)$$

Also, Ks is a predetermined value not larger than 1. From the equations (1) to (3), it will be understood that the modification factors KL1, KL2 are given respectively by ratios of the time periods equivalent to lengths of the segments to the time period $(T_i + T_{i-1})$ during which the segments of the sensing blade make one rotation.

Accordingly, the modification factors KL1, KL2 correspond to values obtained by sampling respective period ratios KR and processing the sampled ratios through a primary filter in the form of software. In the equation (4) described later, the thus-produced modification factors KL1, KL2 are used to modify respective period values to determine the mean angular acceleration variances ΔW.

After the process in step S4 or S5 is completed, or when the learning permissible conditions are not met in step S2, the control goes to next step S6 to determine whether learned values of the modification factors KL1, KL2 are proper.

The modification factors KL1, KL2 provide values for absorbing errors in the period of the output signal SGT from the crank angle sensor 4 generated by various causes, as described above, and their proper range can be calculated in the design stage. Whether the absolute values of the modification factors KL1, KL2 are in the proper range is determined in step S6, and a process necessary for the out-of-range case is performed in step S7.

One example of setting the proper range will now be explained with reference to FIG. 4. In of FIG. 4, the horizontal axis represents values of the modification factors KL1, KL2, and the vertical axis represents frequency distribution of the modification factors KL1, KL2. Because KL1+KL2=1 holds theoretically in a steady state as seen from the above equations (1) and (2), the frequency distribution is symmetrical horizontally about 1.

Figure 4:
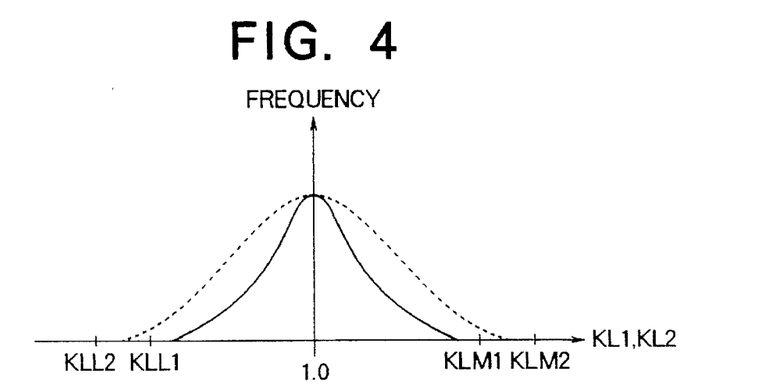
FIG. 4 is a graph for explaining frequency distribution and proper range setting of learned values in one embodiment of the misfire detector for an internal combustion engine according to the present invention.

In FIG. 4, the solid line indicates the distribution calculated in the design stage. Based on this distribution, design determination values can be set as a design lower limit value KLL1 and a design upper limit value KLM1. In practice, however, the values of the modification factors KL1, KL2 may temporarily vary in excess of the limit values, during transient operation, for example.

Figure 5:
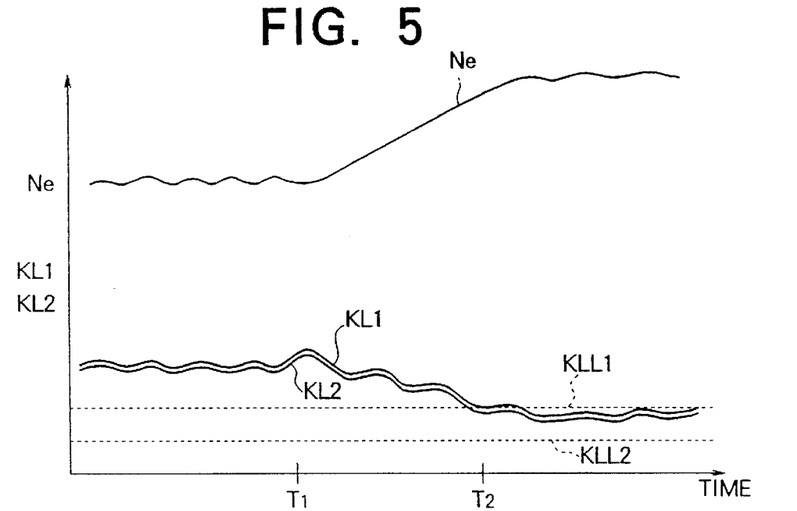
FIG. 5 is a graph for explaining behavior and proper range setting of learned values during accelerated operation in one embodiment of the misfire detector for an internal combustion engine according to the present invention.

FIG. 5 shows behavior of the modification factors KL1, KL2 during accelerated operation. When a rotational speed Ne of the engine is increased as shown in FIG. 5 with accelerated operation, the period of the output signal SGT from the crank angle sensor 4 is gradually shortened. As seen from FIG. 5, therefore, the learned values; i.e., the modification factors KL1, KL2, are gradually reduced in accordance with the above equation (3) to such an extent that they may temporarily exceed the design lower limit value KLL1 set on assumption of steady operation. Thus, the actual modification factors KL1, KL2 have a distribution as indicated by the broken line in FIG. 4. In view of that, the design determination values are usually set as a design lower limit value KLL2 and a design upper limit value KLM2 with a tolerance.

Returning to step S6, the modification factor propriety determining means 58 determines whether the modification factors KL1, KL2 are in the proper range; i.e., they are values between the design lower limit value KLL2 and the design upper limit value KLM2. If any value is out of the proper range, the control goes to step S7 where the modification factors KL1, KL2 are reset to their preset initial values. After the process of step S7 is completed, or when the modification factors KL1, KL2 are determined in step S6 to fall in the proper range, the control goes to step S8.

Then, it is determined in step S8 whether the engine is under a steady operating condition or a start-up operation. The misfire detector is usually associated with other engine control functions or means including a start-up switch (not shown). When the start-up is turned on, the engine is determined as being under the start-up operation. In this case, in step S9, the current value of the modification factors KL1, KL2 are stored as learned values in a memory (not shown).

Since the modification factors KL1, KL2 are not updated during stalling of the engine and the start-up operation, the values stored in the memory in step S9 are final values of the modification factors KL1, KL2 in the latest steady operation. After the process of step S9 is completed, or when the engine is determined in step S8 as being not under the start-up operation, the control goes to step S10.

In step S10, the difference between the modification factors KL1 and KL2 is calculated and, in step S11, it is determined whether the difference between the modification factors KL1 and KL2 is larger than a proper value or not. If the difference therebetween exceeds the proper value, the values of the modification factors KL1, KL2 are reset to their preset values in step S12. After the process of step S12 is completed, or when the difference between the modification factors KL1 and KL2 is determined in step S11 as being not larger the proper value, the control goes to step S13 (FIG. 3).

Here, the preset initial values means the values stored in the memory in step S9.

In this connection, the modification factors KL1 and KL2 are theoretically symmetrical about 1.0 in FIG. 4 during steady operation, and are shifted in the same direction with respect to 1.0 during the transient operation as described above with reference to FIG. 5. Accordingly, by determining whether the difference between the modification factors KL1 and KL2 is larger than the proper value or not, upper and lower limits of the design determination values can be set to have a narrower range therebetween; i.e., set from the design lower limit value KLL2 and the design upper limit value KLM2 to respectively the design lower limit value KLL1 and the design upper limit value KLM1. As a result, when the modification factors KL1 and KL2 are in the range between the design lower limit values KLL1 and KLL2 and the range between the design upper limit values KLM1 and KLM2 owing to operating conditions other than the accelerated or decelerated condition, this can be detected as a failure.

Further, when the difference between the modification factors; i.e., between the learned values, exceeds the proper value, the learned values are reset to not fixed values, but the values stored under the start-up operation (i.e., the final values during the latest steady operation). Therefore, when the difference between the learned values exceeds the proper value owing to some transient cause, the values learned so far can be used without repeating the process of learning, and reliable misfire determination can be restarted immediately.

Figure 3:
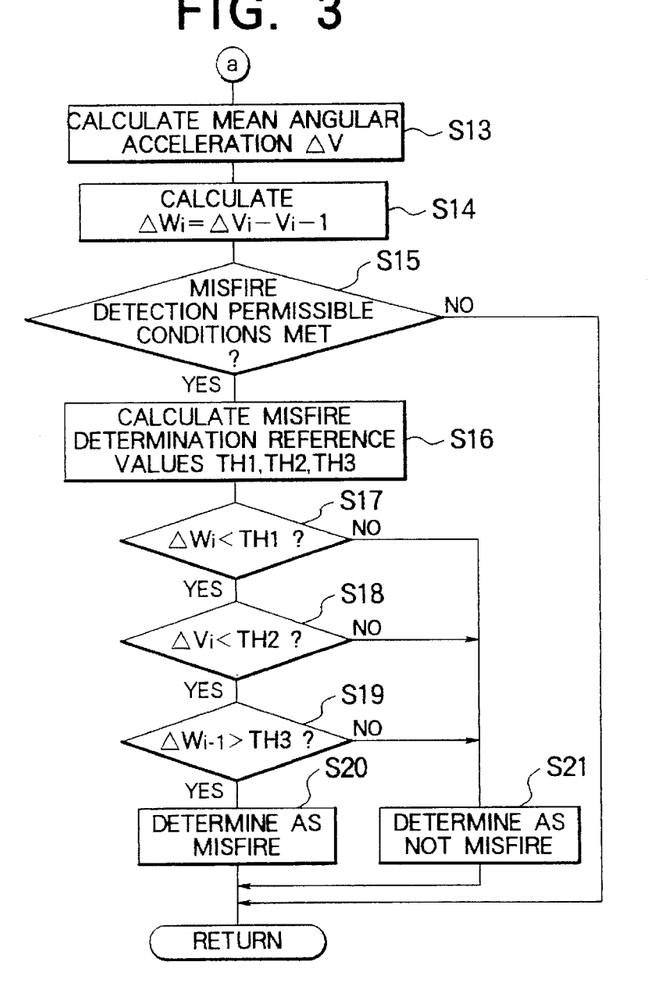
FIG. 3 is a flowchart for explaining operation of one embodiment of the misfire detector for an internal combustion engine according to the present invention.

Following that, in step S13 in FIG. 3, the period variation factor calculating means 54A calculates, based on the period T calculated in step S1 and the modification factors KL1, KL2 stored in the memory in step S9, mean angular accelerations ΔV in accordance with the following equations (4) and (5), respectively: for the case immediately after BTDC 5° of the first and fourth cylinders $$\Delta V = 1/T_i \times (KL1_{i-1}/T_i - KL2_{i-1}/T_{i-1}) \quad (4)$$

for the case immediately after BTDC 5° of the second and third cylinders $$\Delta V = 1/T_i \times (KL2_{i-1}/T_i - KL1_{i-1}/T_{i-1}) \quad (5)$$

In the above equations (4) and (5), the suffix i represents the current timing of period calculation and the suffix i-1 represents the preceding timing of period calculation. Also, KL1 and KL2 are modification factors (learned values) for canceling the errors of the period caused by the angular errors of the segment edges, as described above, and are calculated in the way also described above.

A description will now be made of the physical meaning of the equations (4) and (5).

In general, the rotational angular speed $\psi(1/S)$ and the mean angular acceleration $\Delta V$ $(1/S^2)$ in circular motion can be defined below by using the period T between the BTDC 5° edges:

$$\omega_i = \pi V/T_i \quad (6)$$

$$\Delta V_i = 1/T_i \times (\omega_i - \omega_{i-1}) \quad (7)$$

In the equation (6), $T_i$ produces an error unless it is the period exactly corresponding to $\pi$. In practice, $T_i$ is a value including the angular errors of the segment edges and hence requires modification. Therefore, a ratio of the angle θ, which includes the detection error of the angular interval between the segment edges corresponding to $\pi$, to $\pi$ is defined as a modification factor $KL_i$ (=θ/π). By incorporating the modification factor $KL_i$ in the equation (6) and putting the equation (6) in the equation (7), the following equation (8) is results:

$$\Delta V_i = \pi/T_i \times (KL_i/T_i - KL_{i-1}/T_{i-1}) \quad (8)$$

As described above in connection with FIG. 10, there are two types of errors involved in detection of the period between the BTDC 5° edges. The equations (4) and (5) result from preparing two types of modification factors KL1, KL2 correspondingly and omitting the multiplication of the constant $\pi$. $\Delta V$ defined by each of the equations (4) and (5) is called a mean angular acceleration.

Then, in step S14, the mean angular acceleration variance (variation) $\Delta W(1/S^2)$ between the current calculated value and the preceding calculated value of the mean angular acceleration is determined in accordance with the following equation (9):

$$\Delta W_i = \Delta V_i - \Delta V_{i-1} \quad (9)$$

Subsequently, in step S15, the misfire determining means 55 determines, based on the information EOS indicating the operating condition of the engine, such as rotational speed (rpm) and load thereof, whether the current operating condition of the engine meets a preset operating condition under which misfire detection is allowed, e.g., whether the rotational speed of the engine is in the range of 1000 to 4000 rpm or not. Only when the misfire detection permissible condition is met, the following misfire detection process is executed.

In step S16, misfire determination reference values TH1, TH2 and TH3 suitable for the current operating condition of the engine are calculated based on respective typical values which have been decided based on the period T beforehand. In subsequent steps S17 to S19, whether a misfire has occurred or not is determined using those misfire determination reference values. Specifically, if all the misfire determination conditions are met, i.e., if the current mean angular acceleration variance $\Delta W_i$ is smaller than the misfire determination reference value TH1, the current mean angular acceleration $\Delta V_i$ is smaller than the misfire determination reference value TH2, and the preceding mean angular acceleration variance $\Delta W_{i-1}$ is larger than the misfire determination reference value TH3, it is determined in step S20 that a misfire has occurred. Following that, the process required in the ease of determination of a misfire; i.e., an operation such as storing the failure information and indicating the failed state, is executed.

The misfire determination reference values TH1, TH3 are set respectively to the aforesaid misfire determination reference values $C_{i-2}$, $C_{i-1}$ in FIG. 9, and the misfire determination reference value TH2 is set to a value slightly above the 0 level of the mean angular acceleration $\Delta V$ in FIG. 9.

If any of the misfire determining conditions is not met in steps S17 to S19, it is determined in step S21 that a misfire is not occurred. Following that, the appropriate process is carried out.

Figure 6:
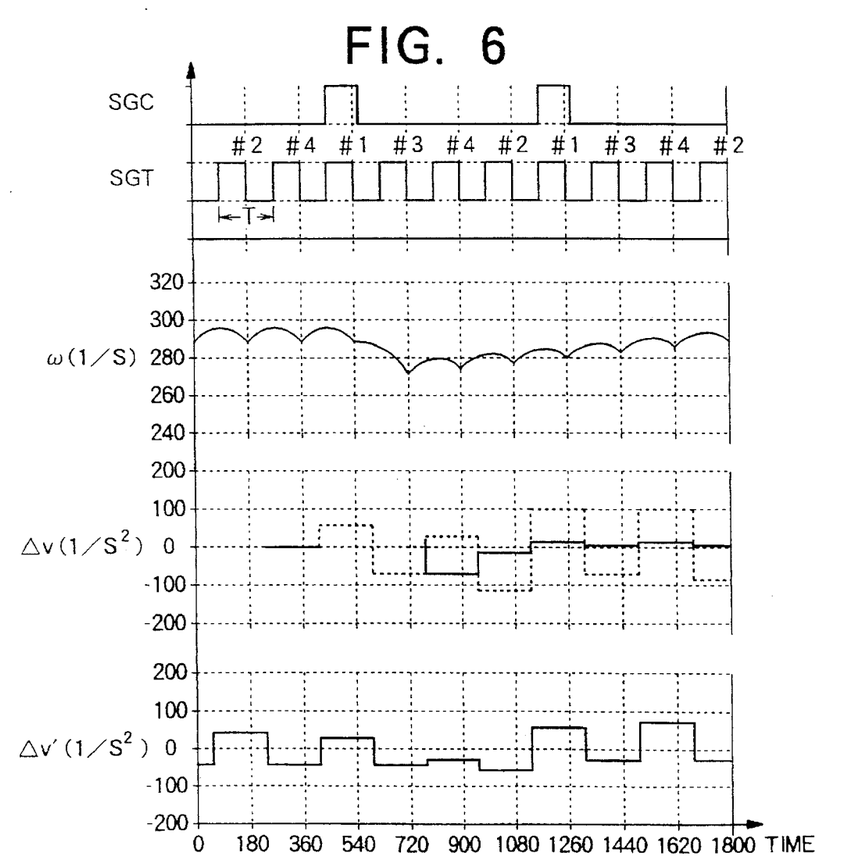
FIG. 6 is a time chart for explaining operation when the learned values are replaced by improper values, in one embodiment of the misfire detector for an internal combustion engine according to the present invention.

FIG. 6 shows a simulated result of the mean angular acceleration $\Delta V$ calculated in the above process. In FIG. 6, SGC is a cylinder identification signal, SGT is an output signal from the crank angle sensor 4 which rises at BTDC 75° and falls at BTDC 5°, #1 to #4 are the numbers of the cylinders to be ignited at respective points in time, ω is an actual angular speed of the engine, $\Delta V$ is a mean angular acceleration calculated based on the period between failing edges of the output signal SGT from the crank angle sensor 4, including the modification factor, and $\Delta V'$ is a mean angular acceleration resulted by assuming the modification factor as 1 (i.e., no modification) in the calculation of $\Delta V$.

By calculating the mean angular acceleration including the modification factor, noise components appearing in $\Delta V'$ are removed and the waveform is simplified as plotted at $\Delta V$ (solid line), which facilitates the subsequent misfire determination process.

Assuming now that KL2 (learned values for #2 and #3 cylinders) is changed at the time $T_0$ to the positive side for some reason, the mean angular acceleration $\Delta V'$ (without modification of the learned values) is not affected, but the mean angular acceleration $\Delta V$ (with modification of the learned values) is shifted to the positive side for #2 and #3 and the negative side for #1 and #4 as indicated by the broken line because the mean angular acceleration for #2 and #3 is judged to be greater than actual.

In such a case, therefore, if above steps S6–S7 and steps S10–S12 are not provided, the signal supplied from the period variation factor calculating means 54A to the misfire determining means 55 would be erroneously determined as indicating the occurrence of a misfire at the time $T_1$ and $T_2$ through the foregoing misfire determination process.

With this Embodiment 1 described above, by determining whether the difference between the modification factors KL1 and KL2 is larger than the proper value or not, upper and lower limits of the design determination values can be set to have a narrower range therebetween; i.e., set from the design lower limit value KLL2 and the design upper limit value KLM2 to respectively the design lower trait value KLL1 and the design upper limit value KLM1. As a result, when the modification factors KL1 and KL2 are in the range between the design lower limit values KLL1 add KLL2 and the range between the design upper limit values KLM1 and KLM2 owing to other operating conditions than the accelerated or decelerated condition, this can be detected as a failure.

Further, with an arrangement such that when the difference between the modification factors, i.e., between the learned values, exceeds the proper value, the learned values are reset to not fixed values, but the values stored under the start-up operation (i.e., the final values during the latest steady operation), when the difference between the earned values exceeds the proper value owing to some transient cause, the values learned so far can be used without repeating the process of learning, and reliable misfire determination can be restarted immediately.

Embodiment 2.

In above Embodiment 1, when the difference between the modification factors; i.e., between the learned values, exceeds the proper value, the learned values as initial values are reset to not fixed values, but the values stored under the start-up operation (i.e., the final values during the latest steady operation). However, a value calculated from the latest modification factors KL1 and KL2 ( i.e., a mean value of both the factors) may be used as each of the initial values.

With this Embodiment 2, by resetting the learned values as initial values to not fixed values, but the mean value of both the latest learned values when the difference between the modification factors, i.e., between the learned values, exceeds the proper value, it is possible to, when the difference between the learned values exceeds the proper value owing to some transient cause, utilize the latest learning result (i.e., a value close to the final learned values falling within the proper range). As a result, the need for repeating the process of learning eliminated, and reliable misfire determination can be restarted immediately.

What is claimed is:

1. A misfire detector for an internal combustion engine comprising:

period measuring means for measuring periods of a plurality of signals per one revolution of a crankshaft generated by a crank angle sensor for a plurality predetermined crank angles in said internal combustion engine, modification factor calculating means for, based on a ratio between the periods of the plurality of signals in a steady operating condition, calculating a plurality of modification factors used to modify errors in period measurements, modification factor propriety determining means for determining whether the plurality of modification factors calculated by said modification factor calculating means are in the proper range or not, period variation factor calculating means for, based on the periods measured by said period measuring means and the modification factors which have been determined as being proper by said modification factor propriety determining means, calculating each period variation factor used to quantitize variations in the period, misfire determining means for determining the occurrence of a misfire based on the period variation factor calculated by said period variation factor calculating means, and processing means for resetting the plurality of modification factors to initial values when the difference between a maximum one and a minimum one of the plurality of modification factors calculated by said modification factor calculating means exceeds a predetermined value, to thereby avoid erroneous misfire detection due to electrical interference and manufacturing inaccuracies in said period measuring means.

2. A misfire detector for an internal combustion engine according to claim 1, wherein said initial values are final values used during the latest steady operation.

3. A misfire detector for an internal combustion engine according to claim 1, wherein said initial values are calculated from maximum one and minimum one of the plurality of modification factors.

4. A misfire detector for an internal combustion engine according to claim 1, wherein said initial values are each a mean value of the latest two among the plurality of modification factors.

5. A misfire detector for an internal combustion engine according to claim 1, wherein said initial values are each calculated by averaging maximum one and minimum one of the plurality of modification factors.

* * * * *